United States Patent

[11] 3,584,913

| [72] | Inventor | Rudolph A. Ferrara |
| | | Warren, Mich. |
| [21] | Appl. No. | 880,655 |
| [22] | Filed | Nov. 28, 1969 |
| [45] | Patented | June 15, 1971 |
| [73] | Assignee | General Motors Corporation |
| | | Detroit, Mich. |

[54] SIDE PANEL FOR SEAT BACK
4 Claims, 3 Drawing Figs.

[52] U.S. Cl. .................................................. 297/218,
297/229
[51] Int. Cl. .................................................. A47c 27/16
[50] Field of Search .......................................... 297/218,
219, 224, 228, 229, 452

[56] References Cited
UNITED STATES PATENTS
2,667,211  1/1954  Krasnov et al. ............... 297/228 X 3,102,755  9/1963  Wilfert ........................ 297/229
3,519,308  7/1970  Kasman et al. ............... 297/218 X Primary Examiner—Casmir A. Nunberg
Attorneys—J. L. Carpenter and E. J. Biskup ABSTRACT: A side panel attached to a seat back frame and movable sideways between a first position wherein the side panel is located within the confines of the frame and a second position wherein it extends laterally outwardly beyond the side limits of the frame. The side panel has an outer configuration which corresponds to a portion of a cushion assembly attached to the frame that also extends laterally outwardly beyond the side limits of the frame. Thus, when the side panel is in the second position, it cooperates with the cushion assembly to provide support for the cover material used in trimming the seat back.

PATENTED JUN 15 1971

3,584,913

INVENTOR.
Rudolph A. Ferrara
BY
E. J. Biskup
ATTORNEY

SIDE PANEL FOR SEAT BACK

Present seat backs used with vehicle seats are generally rectangular in design having the front part thereof provided with a spring assembly which is covered with a foam-type padding and an outer cover sheet. The cover sheet is usually made in the form of an envelope which is presewn on all sides and is slipped over the composite seat back frame and spring assembly as one of the final operations in the manufacture of a seat. The lower ends of the envelope are hog-ringed or otherwise fastened to the underside of the seat back to complete the installation.

One form of seat back which is presently being considered for use with vehicle seats is wider in the transverse direction adjacent the top portion of the seat back frame than it is at the bottom portion. This particular seat design permits the seat back to conform to the corresponding inner contour of the vehicle body while providing sufficient clearance for the usual arm rest attached to the vehicle door. One method of trimming a seat back having a lesser dimension at its lower portion than at its upper portion is to leave a vertical slit along the lower side of the cover sheet envelope. The cover sheet envelope can then be slipped over the enlarged portion of the seat back and the slit as well as the open bottom of the cover sheet can be closed by the application of suitable fasteners. In order to conceal the side slit and fasteners, a decorative side molding of some form would then be applied to the seat back. As should be apparent, however, the use of a method of this type for installing a cover sheet envelope to a seat assembly would prove to be both time-consuming and expensive inasmuch as it requires a number of additional operations and parts which necessarily would have to be utilized in the manufacture of the seat back.

Accordingly, the objects of the present invention are to provide a seat back assembly which, when viewed from the front or rear, is wider at the top than at the bottom but does not require the cover sheet envelope to have a side slit prior to installation over the seat back frame; to provide a seat back frame having a side panel which is movable between a first position wherein it is located within the confines of the seat back frame and a second position wherein it extends laterally outwardly beyond one side edge of the seat back frame; to provide a seat back assembly having a resilient cushion carried by the front part of the seat back frame that has an upper portion extending laterally outwardly beyond one side edge of the seat back frame and also a side panel attached to the seat back frame that is movable laterally outwardly so as to conform in configuration with the outwardly projecting portion of the resilient cushion; to provide a seat back which when viewed from the front is wider at its upper portions than its lower portions and has the seat back frame supporting a side panel that is movable outwardly so as to serve as a rigid support for the cover sheet envelope; to provide a seat back frame which is generally rectangular in configuration and supports a side panel for adjustable movement to an extended position so as to increase the upper dimensions of the seat back when viewed from the front or rear thereof; and to provide a side panel for a seat back frame that is pivotally supported at its upper end and is movable to a laterally outwardly projecting position where it is maintained through a latching arrangement carried by the seat back frame.

Other objects and advantages of the present invention will be apparent from the following description and drawing wherein.

Figures 1, 2, 3:
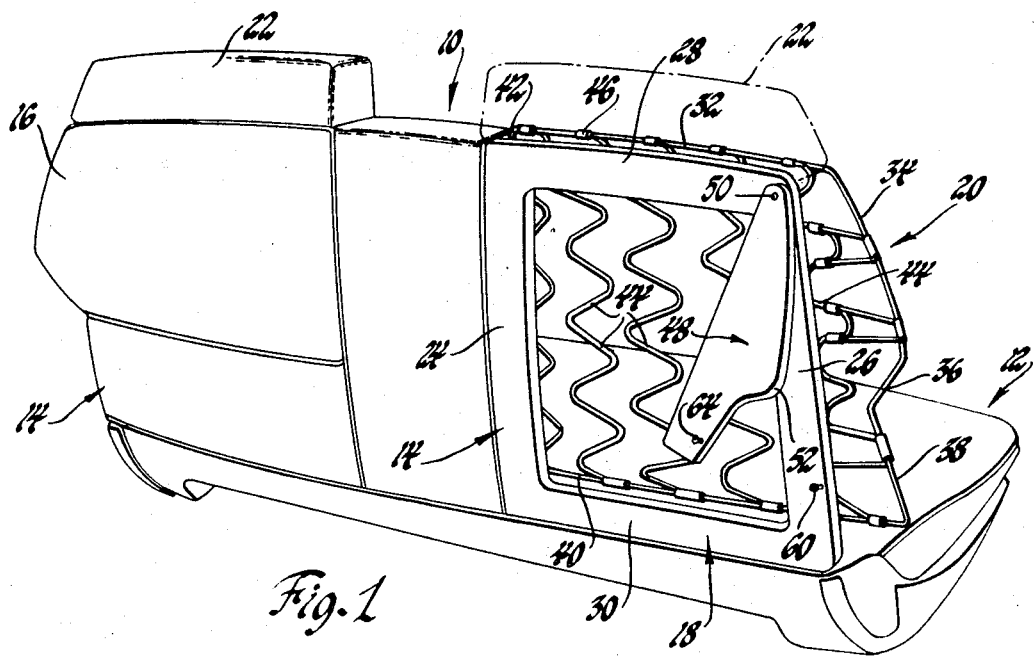
FIG. 1 is a perspective view showing a vehicle seat having a seat back made in accordance with the invention.
FIG. 2 is an enlarged elevation view of an outboard end of the seat back incorporated with the seat of FIG. 1.
FIG. 3 is an enlarged sectional view taken on line 3-3 of FIG. 2 and shows a latch device used with the present invention.

Referring to the drawing and more particularly FIG. 1 thereof, a bench-type vehicle seat 10 is shown comprising the usual seat cushion 12 supporting a pair of laterally spaced upright seat backs 14, each of which serves as a support for the back portion of a seat occupant. As shown, one of the seat backs 14 is trimmed with a cover sheet envelope 16, while the other is shown in skeleton form revealing the inner construction which includes a seat back frame 18 and a cushion or spring assembly 20 attached to the front part thereof. The seat 10 is intended to accommodate two occupants and has the upper portion of each seat back 14 supporting a transversely extending headrest 22 which can be vertically adjusted through suitable adjusting means (not shown). It will be noted that the outboard end of each seat back 14 at the upper portion thereof projects laterally outwardly so as to conform in configuration with the inside contour of the vehicle.

The seat back frame 18 is generally rectangular in form and consists of an integral metal stamping that includes a pair of vertical legs 24 and 26 connected to horizontal upper and lower legs 28 and 30, respectively. The lower leg 30 is hingedly or otherwise mounted by conventional means (not shown) to the lower rear end of the seat cushion frame.

The spring assembly 20 attached to the front of the seat back frame 18 includes a border wire having a straight transversely extending upper section 32 at the upper end thereof which leads to a downwardly extending upper side section 34 which extends laterally outwardly beyond the side limits of the seat back frame 18. The side section 34 connects with an inwardly extending transitional section 36 which, as seen in FIG. 2, leads to a lower side section 38. A lower horizontal wire section 40 extends transversely along the lower leg 30 of the seat back frame 18 for connection with an upwardly extending vertical section 42 leading to and connected with the section 32. A plurality of zigzag sinuous spring elements 44 extend between the upper and lower sections 32 and 40 respectively of the border wire and are mechanically fastened thereto through suitable clips, one of which is indicated by the numerals 46. Although not shown, the usual wire elements are utilized for attaching the spring assembly 20 to and spacing it from the front face of the seat back frame 18.

A planar side panel 48 is mounted to the rear face of the seat back frame 18 through a pivotal connection 50 located at the upper right-hand corner of the seat back frame as seen in FIGS. 1 and 2. The side panel 48 is preferably made from a sheet metal stamping and has a side edge 52 which conforms in configuration with the outwardly projecting portion of the border wire which includes the upper side section 34 and transitional section 36. The side panel 48 is movable sideways and has two positions, one of which permits it to be located within the confines of the seat back frame 18 as shown by the phantom lines in FIG. 2. The second position is shown in full lines in FIG. 2 wherein the side panel 48 is located so as to have its outer side edge 52 in alignment with the outwardly projecting portion of the border wire. In this latter position, the side panel 48 is locked to the seat back frame 18 through a latching device 54 shown in FIG. 3 which includes a plunger-type bolt 56 supported for axial sliding movement by a cup-shaped housing 58 secured to the front face of the seat back frame. The bolt 56 has a rounded head 60 that extends through an opening 61 in leg 26 and is normally biased toward the extended position shown by a coil spring 62 located within the housing 58. It will be noted that the lower end of the side panel 48 has a beveled edge 63 which permits the side panel 48 to ride over the rounded head 60 after which the spring 62 urges the bolt 56 to move into an aperture 64 formed in the side panel 48 when the latter moves from the concealed to the extended position. The side panel 48 is then locked securely in the full line position of FIG. 2.

The seat back assembly with the adjustable side panel 48 permits the cover sheet 16 to have the side edges thereof sewn and assume the configuration shown in FIG. 1 prior to installation even though the final form of the seat 10 after trimming has the upper portion thereof wider than the lower portion as viewed from the front or rear of the seat. In further explanation of this feature of the invention, it will be noted that in trimming the seat back 14, the usual padding will be placed over the spring assembly 20, after which the presewn cover sheet envelope having a configuration conforming with that of the seat back 14 will have the narrower dimension placed over the assembly and pulled downwardly over the spring assembly 20 and seat back frame 18. Inasmuch as the border wire is made of a resilient spring wire, inward flexing movement thereof occurs during such installation so that the narrower portion of the cover sheet envelope can be moved along section 34 downwardly beyond the transitional section 36 of the border wire. At this point, the border wire will then return to its normal form extending the cover sheet envelope outwardly as shown in FIG. 2. To complete the installation, the side panel 48 then is shifted sideways about the pivotal connection 50 from the phantom line position to the full line position of FIG. 2 at which time automatic locking of the side panel 48 occurs through the latching device 54 shown in FIG. 3. Thus, the seat back frame 18 has the outboard side edge thereof provided with a rigid support member which together with the spring assembly 20 maintains the outer cover sheet material and padding as in the desired configuration with the upper parts of the seat back wider than the lower portions.

Various changes and modifications can be made in this construction without departing from the spirit of the invention. Such changes and modifications are contemplated by the inventor and he does not wish to be limited except by the scope of the appended claims.

I claim:

1. A vehicle seat having a seat back attached to a seat cushion, said seat back comprising a generally rectangular frame, a cushion assembly attached to said frame and providing resilient support for the back portion of a seat occupant, said cushion assembly having an upper portion thereof extending laterally outwardly beyond the side limits of the frame, a flat panel having a side edge thereof conforming in configuration with said upper portion of the spring assembly, means supporting said panel on said frame for sidewise movement along a plane substantially parallel to the plane of the frame and to an extended position wherein said side edge of the panel is located beyond the side limits of the frame a distance corresponding to the distance of the upper portion of the spring assembly relative to the frame so as to provide support for cover material used in trimming the seat back.

2. The vehicle seat of claim 1 wherein said frame is provided with a latch device for locking said side panel in position when located in the extended position.

3. The vehicle seat of claim 1 wherein said means supporting said panel comprises a pivotal connection mounting the panel on an upper portion of said frame.

4. A seat back adapted to be attached to a seat cushion, said seat back comprising a generally rectangular frame, a spring assembly attached to said frame for providing resilient support for the back portion of a seat occupant, said spring assembly comprising a border wire and a plurality of sinuous spring elements, an upper portion of said spring assembly extending laterally outwardly beyond the side limits of the frame, a flat panel having a side edge thereof conforming in configuration with said upper portion of the spring assembly, means pivotally supporting said panel on said frame adjacent the outboard side thereof for swinging movement along a plane substantially parallel to the plane of the frame and to an extended position wherein said side edge of the panel is located beyond the side limits of the frame a distance corresponding to the distance of the upper portion of the spring assembly relative to the frame so as to provide support for cover material used in trimming the seat back, and a latch device carried by said frame for locking said side panel when located in said extended position.